United States Patent Office 3,143,462
Patented Aug. 4, 1964

3,143,462
NEMATOCIDAL PESTICIDAL AGENT
Klaus Schwarzer and Arnold Hausweiler, Cologne-Flittard, and Bernhard Homeyer, Opladen, Germany, assignors to Farbenfabriken Bayer Aktiengesellschaft, Leverkusen, Germany, a corporation of Germany
No Drawing. Filed Apr. 21, 1960, Ser. No. 23,637
Claims priority, application Germany Apr. 29, 1959
4 Claims. (Cl. 167—55)

The present invention relates to and has as its objects new and useful nematocidal agents which contain as an active ingredient 4-chlorobutene-Δ-2-ol-(1) or its functional derivatives.

It is known that a series of aliphatic halogen compounds such as 1,3-dichloropropene, 2,3-dichloropropene-(1) or 1,4-dichlorobutene-(2) are suitable for combating nematodes.

These compounds are vapourized at relatively low temperatures, act exclusively or for the most part in the gaseous phase. Disadvantages of these compounds are the not altogether simple manner of application (the application has to be carried out by injection into the ground) and undesired plant-damaging side effects which after the treatment of the ground frequently make a longer waiting time necessary before the ground can be planted with useful plants.

It has now been found that 4-chlorobutene-2-ol-(1) and its functional derivatives possess an outstanding nematocidal activity and give rise to no plant-damaging side effects.

Among functional derivatives, compounds are to be understood which are obtained from the basic substance by substitution at the hydroxyl group. Such compounds are, for instance, the esters of 4-chlorobutene-2-ol-(1) with carboxylic acids or the ethers with aliphatic or cyclic, optionally substituted alkyl groups. Of the two possible isomers of the compounds according to the invention, the cis-form as well as the trans-form are equally effective as nematocides.

The nematocidal activity of the compounds according to the invention, with simultaneous good tolerance by the plant, is surprising and was not in any way to be foreseen, since aliphatic hydroxyl compounds in which the hydroxyl group is in beta-position to a carbon-to-carbon double bond, generally give rise to damaging effects on the plants. Thus for instance allyl alcohol is a commercial herbicide.

The production of 4-chlorobutene-2-ol-(1) and its functional derivatives can be carried out by various processes known as such. For example, the esters are obtainable by reaction of 1,4-dichlorobutene-(2) with the alkali metal salts of carboxylic acids. Esters with the cis-configuration can also be obtained by the reaction of 2,5-dihydrofuran with carboxylic acid chlorides in the presence of zinc or zinc-chloride. By trans-esterification with methanol the free alcohol is obtained. In a direct manner 4-chlorobutene-2-ol-(1) can be obtained by reacting butene-2-diol-(1,4) with hydrogen chloride or thionyl chloride.

Example

The testing of the compounds according to the invention as to nematocidal effect was carried out on *Meloidogyne incognita*. 5 litres of infested soil were mixed with the compound to be tested in quantities of 50, 100 and 150 parts per million and after a refraining period of 1 week were planted with tomatoes in Mitscherlich pots. After 8 weeks root-knot nematodes were evaluated. In the following table the activity of several compounds is given as a medium value from two sets of experiments.

| Compound | Killing of nematodes, effect at a concentration of— | | |
|---|---|---|---|
| | 50 p.p.m. | 100 p.p.m. | 150 p.p.m. |
| | Percent | Percent | Percent |
| $CH_2OH-CH=CH-CH_2Cl$ | 100 | 100 | 100 |
| $HO-CH_2-CH=CH-CH_2Cl$ | 98 | 100 | 100 |
| $CH_3-CO-O-CH_2-CH=CH-CH_2Cl$ | 90 | 100 | 100 |
| $ClCH_2-CO-O-CH_2-CH=CH-CH_2Cl$ | 80 | 90 | 95 |
| $CH_3-CO-O-CH_2-CH=CH-CH_2Cl$ | 90 | 98 | 100 |
| $CH_3-O-CH_2-CH=CH-CH_2Cl$ | 100 | 100 | 100 |

Further compounds which have been tested and proven to be effective nematocides are the following:

$$CH_2Cl-CH=CH-CH_2-O-CH_2-CH=CH-CH_2Cl$$
$$CH_2Cl-CH=CH-CH_2-O-CH_2-CH=CH-CH_2OH$$

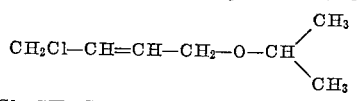

$$CH_2Cl-CH=CH-CH_2-O-CO-CH_2-CH_2-CH_3$$

We claim:
1. Process for combating nematodes which comprises treating nematode-infested soil with a compound of the following formula

$$Cl-CH_2-CH=CH-CH_2-O-R$$

in which R stands for a member selected from the group consisting of acyl radicals of lower alkanoic acids containing up to 4 carbon atoms, hydrogen, lower alkyl radicals up to 4 carbon atoms, lower hydroxy-substituted and lower chloro-substituted alkyl radicals up to 4 carbon atoms.

2. Process for combating nematodes which comprises treating nematode-infested soil with 4-chloro-butene-2-ol-(1).

3. Process for combating nematodes which comprises treating nematode-infested soil with [4-chloro-butene-2-ol-(1)]-methyl ether.

4. Process for combating nematodes which comprises treating nematode-infested soil with [4-chloro-butene-2-ol-(1)]-acetate.

References Cited in the file of this patent

UNITED STATES PATENTS

| | | |
|---|---|---|
| 2,840,503 | Whetstone | June 24, 1958 |
| 2,840,598 | Schwartz | June 24, 1958 |
| 2,852,426 | Stansbury | Sept. 16, 1958 |
| 2,863,906 | Baranauckas | Dec. 9, 1958 |

OTHER REFERENCES

King: U.S. Dept. Agr. Handbook No. 69 (1954), p. 92.